US008545086B2

(12) United States Patent
Kim et al.

(10) Patent No.: US 8,545,086 B2
(45) Date of Patent: Oct. 1, 2013

(54) BACKLIGHT UNIT

(75) Inventors: Geun Young Kim, Suwon (KR); Jong Jin Park, Daejeon (KR); Jung Hun Lee, Seoul (KR); Sun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 12/851,843

(22) Filed: Aug. 6, 2010

(65) Prior Publication Data

US 2011/0096528 A1 Apr. 28, 2011

(30) Foreign Application Priority Data

Oct. 27, 2009 (KR) ........................ 10-2009-0102234

(51) Int. Cl.
*F21V 7/04* (2006.01)
(52) U.S. Cl.
USPC .......................................... 362/621; 362/97.1
(58) Field of Classification Search
USPC ....... 362/621, 612–613, 625–626, 97.1–97.3, 362/606–607; 349/61–71
See application file for complete search history.

(56) References Cited

U.S. PATENT DOCUMENTS

| 2006/0002146 A1* | 1/2006 | Baba ............................. 362/613 |
| 2006/0221638 A1* | 10/2006 | Chew et al. .................... 362/613 |
| 2010/0060818 A1* | 3/2010 | Ajichi et al. .................... 349/64 |

FOREIGN PATENT DOCUMENTS

| EP | 2275846 A1 | 1/2011 |
| JP | 2000-171641 A | 6/2000 |
| KR | 10-2001-0016747 A | 5/2001 |
| KR | 10-2005-0015669 A | 2/2005 |
| KR | 10-2007-0040011 A | 4/2007 |
| KR | 10-2008-0016188 A | 2/2008 |
| WO | 2009-016950 A1 | 2/2009 |
| WO | WO 2009016950 A1 * | 2/2009 |

OTHER PUBLICATIONS

Communication dated Aug. 3, 2012, issued by the State Intellectual Property Office of the People's Republic of China in counterpart Chinese Patent Application No. 201010258170.1.
Communication dated Apr. 8, 2011, issued by the European Patent Office in counterpart European Application No. 10172751.9.
Communication dated Apr. 9, 2013 issued by the State Intellectual Property Office of P.R. China in counterpart Chinese Patent Application No. 201010258170.1.

* cited by examiner

*Primary Examiner* — Anne Hines
(74) *Attorney, Agent, or Firm* — Sughrue Mion, PLLC (57) ABSTRACT

There is provided a backlight unit.
The backlight unit is configured to include: a plurality of light sources; a plurality of light guide plates being arranged alternately with the light sources so that light emitted from the light sources is incident; and a chassis receiving the light sources and the light guide plates, wherein the plurality of light guide plates are disposed to be spaced apart from each other, being symmetrical to each other in order to face the central region of the chassis, a pair of light guide plates opposed to each other on the central region being connected to each other so that the light therefrom is mixed.

19 Claims, 6 Drawing Sheets

BACKLIGHT UNIT

CROSS-REFERENCE TO RELATED APPLICATIONS

This application claims the priority of Korean Patent Application No. 10-2009-102234 filed on Oct. 27, 2009, in the Korean Intellectual Property Office, the disclosure of which is incorporated herein by reference.

BACKGROUND OF THE INVENTION

1. Field of the Invention

The present invention relates to a backlight unit, and more particularly, to a backlight unit that can be used in the illumination of a display device by adopting an LED package as a light source.

2. Description of the Related Art

Recently, various sorts of image display devices have been used and among them, a Liquid Crystal Display (LCD) may be considered to have been mainly used.

An LCD has been applied to various devices, from a thin film type wall hanging television, a notebook computer, a monitor for a desktop computer, a navigation device, a PDA, a mobile telephone to a game machine. The liquid crystals that constitute the display element of the LCD described above cannot emit light by themselves, but serve merely to transmit or block light, according to electrical signals applied thereto.

Therefore, in order to display information on a liquid crystal panel, a surface emitting device that illuminates the liquid crystal panel from the rear, that is, a backlight unit, should be separately provided in the liquid crystal display device. The backlight unit described above should uniformly emit light from the liquid crystal panel by enhancing the brightness of light and forming a uniform surface light source, such that it may be considered to be very important in terms of product quality.

As the image display device has recently become larger and slimmer with a high performance than a previous model, it can implement local dimming, with a thin thickness. Therefore, there has been active development in order to implement a backlight for providing excellent image quality in a large-sized LCD. In the case of the large-sized LCD, a brightness gradient is not uniform, as a plurality of light guide plates are disposed in parallel, in order that they are disposed so as to emit light in a single direction, thereby reducing overall brightness uniformity.

Further, clarity is lowered as bright lines or dark lines are generated, thereby causing a problem in which the thickness of the light guide plates should be increased or a special pattern should be additionally processed.

Also, several problems arise in that clarity is lowered and life span is reduced in a boundary part at the time of performing local dimming, thereby creating difficulties in development.

SUMMARY OF THE INVENTION

An aspect of the present invention provides a backlight unit having a simple structure and being capable of improving brightness and brightness uniformity by preventing bright lines or dark lines from being generated on a large-screen liquid crystal display, thereby making it possible to improve clarity and implement clearer image quality.

According to an aspect of the present invention, there is provided a backlight unit including: a plurality of light sources; a plurality of light guide plates being arranged alternately with the light sources so that light emitted from the light sources is incident thereupon; and a chassis receiving the light sources and the light guide plates, wherein the plurality of light guide plates are disposed to be spaced apart from each other, being symmetrical to each other in order to face the central region of the chassis, a pair of light guide plates opposed to each other on the central region being connected to each other so that the light therefrom is mixed.

Further, the light guide plate arranged on the central region may include a light receiving surface on which light is incident on one side surface thereof and another light receiving surface opposed to the light receiving surface on the other side surface thereof so that a pair of light receiving surfaces are symmetrical to each other, having the central region of the light guide plate therebetween.

Further, the plurality of light sources may emit the light to the central region direction of the chassis, respectively.

Further, the light source may include a substrate disposed horizontally on a bottom surface of the chassis and having circuit wiring; and a plurality of LED packages vertically mounted on the substrate so that an LED chip faces the light receiving surface of the light guide plate.

Further, the LED package may include a lead terminal electrically connected to the circuit wiring along a side surface of a main body and be mounted on the substrate through the side surface.

Further, the lead terminal may include first leads each projected horizontally from the side surface of the main body in a minor axis direction to a rear surface of the main body; and a second lead bent vertically from one end of the first lead to be extended to a front surface of the main body and having one end bent vertically to the side surface of the main body in a major axis direction.

Further, the second lead may be formed to be parallel to the side surface of the main body in the minor axis direction and the side surface thereof in the major axis direction to have an entirely 'L' shaped structure.

Further, in the light source, the plurality of LED packages may be arranged on the bar-shaped substrate so that the respective LED chips provided on the plurality of LED packages face in the same direction.

Further, the light guide plate may further include a reflecting layer on a side cross-section opposed to the light receiving surface.

Further, the backlight unit may further include an optical sheet disposed on the upper portion of the light guide plate and receiving light.

According to another aspect of the present invention, there is provided a backlight unit including: a plurality of light sources; a plurality of light guide plates being arranged alternately with the light sources so that light emitted from the light sources is incident thereupon; and a chassis receiving the light sources and the light guide plates, wherein the plurality of light guide plates are disposed to be spaced apart from each other, being symmetrical to each other in order to face the central region of the chassis, the light sources of the plurality of light sources disposed, respectively, between the light guide plate and another light guide plate to emit light to the light guide plates on both sides adjacent to each other so that the light therefrom is mixed.

Further, the plurality of light sources may emit light between the light receiving surface of the light guide plate adjacent to each light source and the side cross-section of another light guide plate to both directions of the light receiving surface and the side cross-section.

Further, the light source may include a substrate disposed horizontally on a bottom surface of the chassis and having circuit wiring; and a plurality of LED packages vertically mounted on the substrate so that a LED chip faces the light receiving surface of the light guide plate.

Further, the LED package may include a lead terminal electrically connected to the circuit wiring along a side surface of a main body and be mounted on the substrate through the side surface.

Further, the lead terminal may include first leads each projected horizontally from the side surface of the main body in a minor axis direction to a rear surface of the main body; and a second lead bent vertically from one end of the first lead to be extended to a front surface of the main body and having one end bent vertically to the side surface of the main body in a major axis direction.

Further, the second lead may be formed to be parallel to the side surface of the main body in the minor axis direction and the side surface thereof in the major axis direction to have an entirely 'L' shaped structure.

Further, in the light source, the plurality of LED packages may be alternately arranged on the bar-shaped substrate so that the direction in which the respective LED chips provided on the plurality of LED packages face and the direction in which another LED chips each adjacent thereto face are changed by 180°.

Further, the light source where the plurality of LED packages are alternately arranged may be disposed on the boundary region between the light guide plates adjacent to each other.

Further, the backlight unit may further include an optical sheet disposed on the upper portion of the light guide plate and receiving light.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention relating to a backlight unit will now be described in detail with reference to the accompanying drawings.

The exemplary embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art.

In the drawings, the shapes and dimensions may be exaggerated for clarity, and the same reference numerals will be used throughout to designate the same or like components.

A backlight unit according to an exemplary embodiment of the present invention will now be described in detail with reference to FIGS. 1 through 6.

Figure 1:
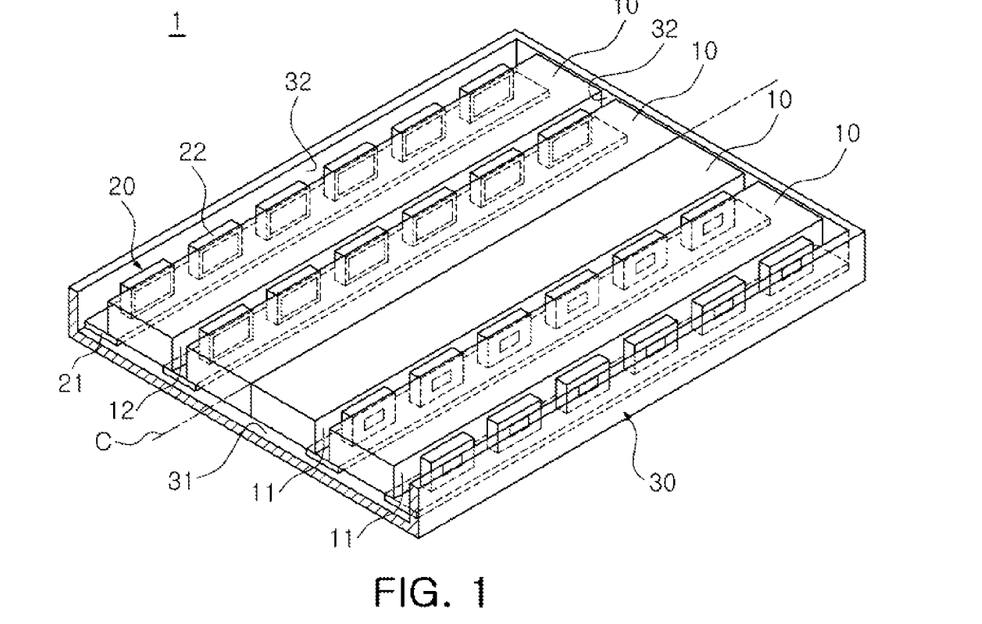
FIG. 1 is a perspective view showing a backlight unit according to an exemplary embodiment of the present invention.
Figure 2:
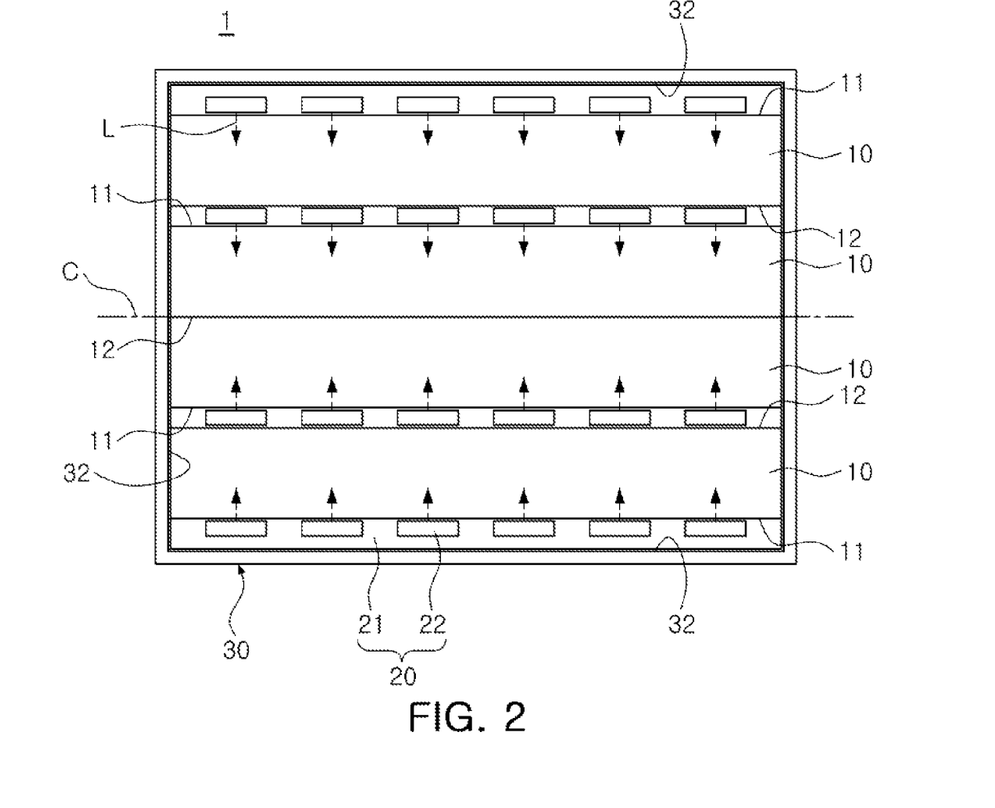
FIG. 2 is a plan view showing the backlight unit shown in FIG. 1.
Figure 3A:
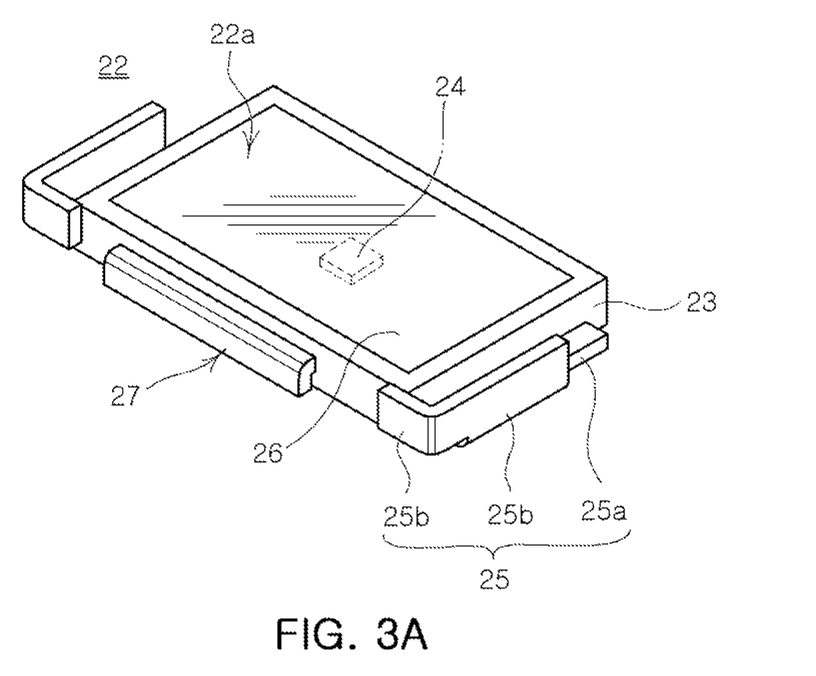
FIG. 3A is a perspective view showing a front surface of an LED package that constitutes a light source of the backlight unit shown in FIG. 1.
Figure 3B:
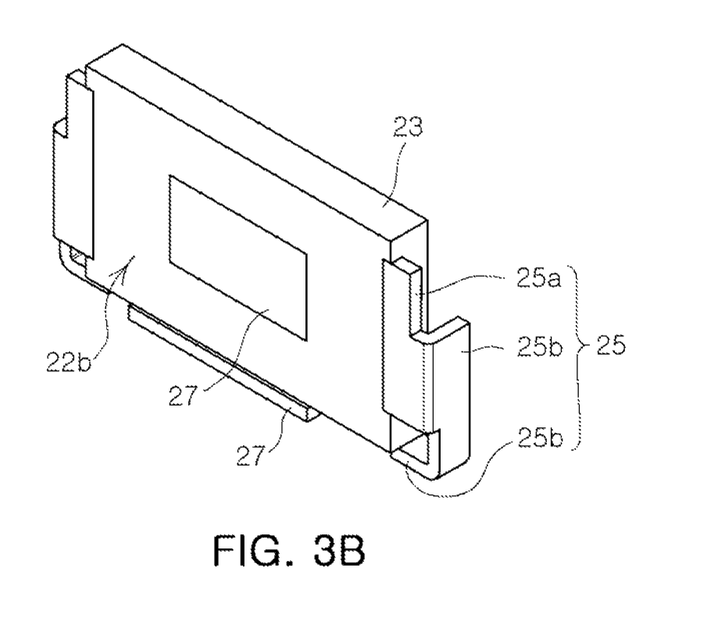
FIG. 3B is a perspective view showing a rear surface of the LED package shown in FIG. 3A.

FIG. 1 is a perspective view showing a backlight unit according to an exemplary embodiment of the present invention, FIG. 2 is a plan view showing the backlight unit shown in FIG. 1, FIG. 3A is a perspective view showing a front surface of an LED package that constitutes a light source of the backlight unit shown in FIG. 1, and FIG. 3B is a perspective view showing a rear surface of the LED package shown in FIG. 3A.

Figure 4:
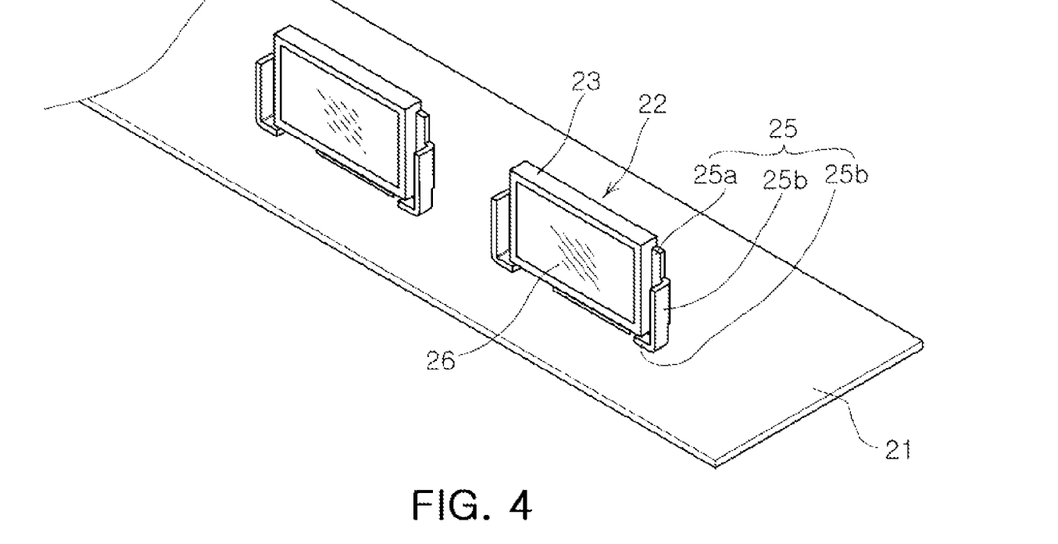
FIG. 4 is a perspective view showing a light source having a structure where all of the LED packages shown in FIG. 3 are arranged to face in the same direction.
Figure 5:
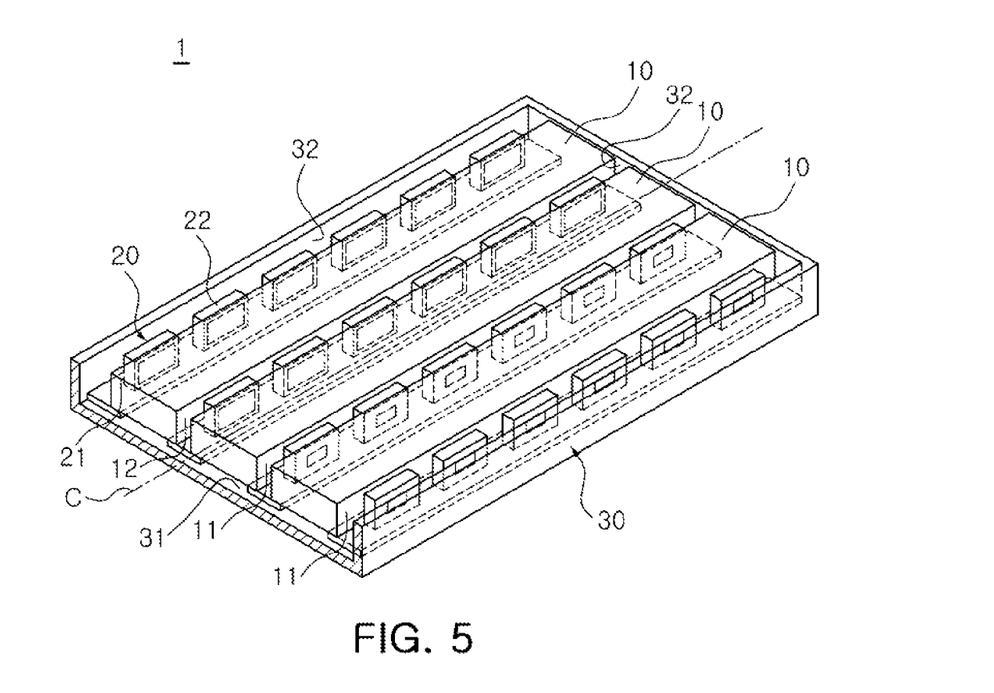
FIG. 5 is a perspective view showing a modification of the backlight unit shown in FIG. 1.
Figure 6:
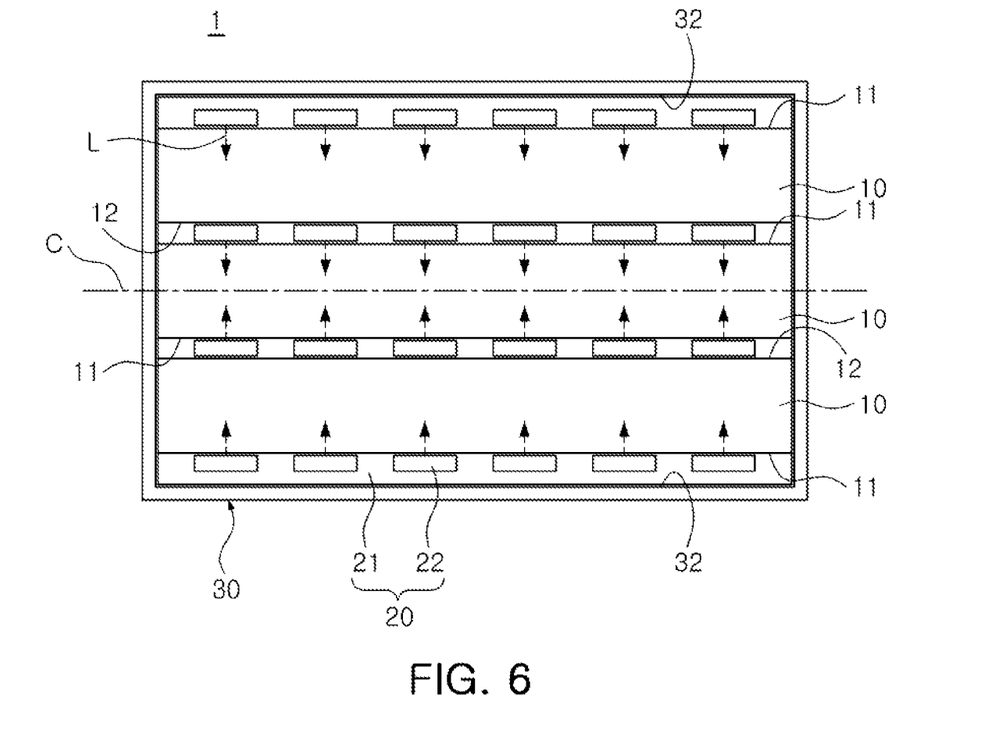
FIG. 6 is a plan view showing the backlight unit shown in FIG. 5.

FIG. 4 is a perspective view showing a light source having a structure in which all of the LED packages shown in FIG. 3 are arranged to face in the same direction, FIG. 5 is a perspective view showing a modification of the backlight unit shown in FIG. 1, and FIG. 6 is a plan view showing the backlight unit shown in FIG. 5.

Referring to FIGS. 1 and 2, the backlight unit 1 according to an exemplary embodiment of the present invention may be configured to include a light guide plate 10, a light source 20, and a chassis 30, and may be configured to further include an optical sheet (not shown) that is disposed on the upper portion of the light guide plate and receives light.

The light guide plate 10 has a rectangular parallelepiped-shaped plate structure, wherein a light receiving surface 11 on which the light sources 20 are disposed to make light incident is preferably provided along a side surface thereof in a major axis direction.

The light guide plate 10 may be made of a transparent resin such as PMMA in order to smoothly induce the light to be incident on the light receiving surface 11, wherein a bottom surface of the light guide plate 10 may be formed in a special pattern (not shown), such as an uneven pattern and the like, to allow light facing the lower portion of the light guide plate 10 to be reflected to the upper portion thereof. Also, the light guide plate 10 may further include a reflective layer (not shown) on a side cross-section 12 opposed to the light receiving surface 11.

The chassis 30 is a frame member that receives and supports the light guide plate 10 and the light source 20 on the inside thereof.

The chassis 30 is configured of a flat-bottomed surface 31 and a side wall 32 that is extended from an outline of the bottom surface 31 to the upper portion of the chassis 30, having a box type structure where the upper surface (or front surface) thereof is opened. The chassis 30 is preferably made of a metallic material in consideration of strength and radiation efficiency; however, it is not limited thereto.

As shown in the drawings, a plurality of light guide plates 10 are alternately disposed inside the chassis 30 with the light sources 20 so that the light emitted from the light sources 20 can be incident on the light guide plates, wherein the number of the disposed light guide plates may be varied according to design size of a liquid crystal display.

In particular, the plurality of light guide plates 10 are disposed to be spaced apart from each other, being symmetrical to each other in order to face a central region of the chassis 30.

More specifically, the light guide plates 10 that divide the chassis 30 into two regions by cutting it into two, being symmetrical to each other in a minor direction, are disposed in each region such that they are symmetrical to each other along a cut line C of the central region.

At this time, the light guide plates 10 disposed in each region are disposed such that their side cross-sections 12, opposed to the light receiving surfaces 11, face the central region, respectively.

The light sources 20 that are disposed on the light receiving surfaces 11 of the respective light guide plates 10, through a disposition structure of the light guide plate 10, emit light L in the central region direction of the chassis 30, respectively. Therefore, as compared to the prior art in which light is emitted toward one side surface to have a high level of brightness in the region of the corresponding side surface so that brightness gradient becomes non-uniform, a high level of brightness is displayed on the central region of the backlight unit 1, such that the brightness gradient is symmetrical.

This can entirely improve clarity and implement clearer image quality in the liquid crystal display.

In the drawings, the light guide plates 10 are disposed to be symmetrical to each other by dividing the side surface of the chassis 30 in the minor axis direction into two. However, the light guide plates 10 may also be disposed to be symmetrical to each other by dividing the side surface of the chassis 30 in the major axis direction into two.

As shown in FIGS. 1 and 2, when a pair of light guide plates 10 are disposed to be opposed and symmetrical to each other, based on the central region of the chassis 30, the side cross-sections 12 opposed to the light receiving surfaces 11 of the respective light guide plates 10 may be surface-contacted and connected to each other along the cut line C of the central region.

As shown in FIGS. 5 and 6, when a single light guide plate is disposed on the central region of the chassis 30 so that the cut line C is positioned in the center of the light guide plate 10, the light guide plate 10 may include a light receiving surface 11 on one side surface thereof and another light receiving surface 11 on the other side surface thereof, opposed to the light receiving surface 11 so that a pair of the light receiving surfaces 11 may also be symmetrical to each other, having the central region of the light guide plate 10 and the cut line C therebetween.

In this case, the light guide plates 10, disposed on the central region, have each light source 20 on both sides disposed so as to be opposed to each other, thereby having two light sources 20.

Therefore, light is mixed in the light guide plate disposed on the central region (or the light guide plate formed by connecting the pair of light guide plates), thereby having asymmetrical structure where the brightness gradient increases toward the central region.

Meanwhile, the light source 20, disposed on the light receiving surface 11 of the light guide plate 10, includes a substrate 21 and a plurality of LED packages 22 that are mounted on the substrate 21.

The substrate 21 includes circuit wiring (not shown) electrically connected to the LED package 22, wherein the substrate 21 may have an entirely bar-shaped structure corresponding to the length of the light guide plate 10 in the major axis direction.

The substrate 21 may be disposed and mounted to be horizontal on the bottom surface 31 of the chassis 30. Therefore, the contact area to the chassis 30 is increased to allow more heat generated from the LED package 22 to be conducted to the chassis 30, thereby making it possible to improve radiation efficiency.

In the LED package 22, an LED chip 24 provided inside a main body 23 is vertically mounted on the substrate 21 to face the light receiving surface 11 of the light guide plate 10.

A structure of the LED package 22 will now be described in detail with reference to FIGS. 3A and 3B.

As shown in the drawings, in the LED package 22, the main body 23 made of silicon or ceramic has a rectangular parallelepiped shape and a receiving space that is exposed to the outside is formed on a front surface 22a of the main body 23 to mount the LED chip 24 thereon.

The receiving space may be filled with a transparent sealing member 26 so that the LED chip 24 is protected, wherein the sealing member 26 may contain a phosphor so that a wavelength of the light emitted from the LED chip 24 is converted.

A heat sink 27 that penetrates through the main body 23 is provided in the bottom surface of the receiving space on which the LED chip 24 is mounted, wherein the heat sink 27 is exposed to the outside through the rear surface of the main body 23. Therefore, the heat generated from the LED chip 24 is discharged directly to the outside through the heat sink 24, thereby making it possible to improve radiation efficiency.

Also, a lead terminal 25 that electrically connects the LED chip 24 to the circuit wiring (not shown) is provided along the side surface of the main body 23.

More specifically, the lead terminal 25 includes first leads 25a each projected horizontally from the side surface of the main body 23 in the minor axis direction to a rear surface 22b of the main body 23, and second leads 25b bent vertically from one end of the first lead 25a to be extended to a front surface 22a of the main body 23 and having one end bent vertically to the side surface of the main body 23 in the major axis direction.

And, the second lead 25b is connected to the first lead 25a to be integrated and is formed to be parallel to the side surface of the main body 23 in the minor axis direction and the side surface thereof in the major axis direction, thereby having an entirely 'L' shaped structure.

Therefore, the side surface on which the lead terminal 25 is provided, more specifically, the side surface in the major axis direction on which the second lead terminal 25b is provided, is mounted to face the substrate 21, such that the LED package 22 is vertically mounted on the substrate 21.

At this time, the heat sink 27 is projected from the side surface of the main body 23, in the major axis direction, on which the second lead terminal 25b is provided, such that it may be provided horizontally on the side surface of the main body 23 in the major axis direction together with the second lead terminal 25b.

Therefore, when the main body 23 is mounted, the heat sink 27 contacts the substrate 21, together with the second lead terminal 25b, to provide a wider mounting space and thus to have a stable mounting structure, and the heat generated from the LED chip 24 can be transferred to the substrate 21 through the heat sink 27, thereby making it possible to additionally obtain the effect that heat radiation efficiency is increased.

As shown in FIG. 4, the plurality of LED packages 22 may be arranged on the bar-shaped substrate 21 at a predetermined interval so that all of the respective LED chips 24 face in the same direction.

As described above, the LED package 22 according to the exemplary embodiment of the present invention and the structure where the LED package 22 is vertically mounted on the substrate mounted horizontally on the chassis 30 can reduce the thickness of the light source, differently from the prior art, and thus can also reduce the size of the boundary region between the light guide plates 10, thereby making it possible to solve the problem in which clarity is reduced.

A backlight unit according to another embodiment of the present invention will now be described in detail with reference to FIGS. 7 through 11.

Figure 7:
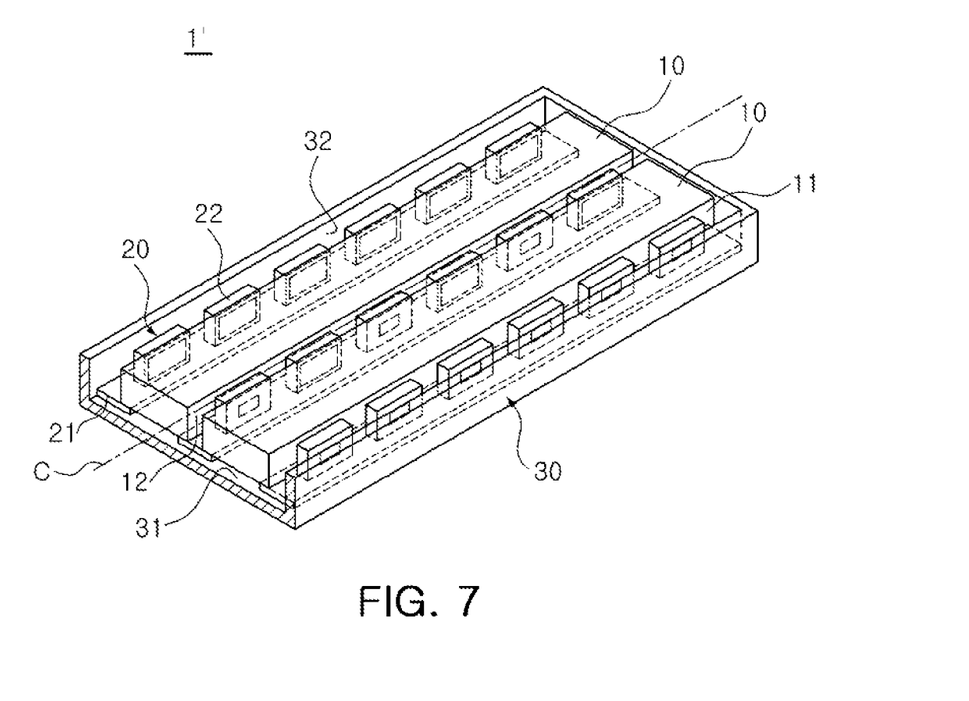
FIG. 7 is a perspective view showing a backlight unit according to another exemplary embodiment of the present invention.
Figure 8:
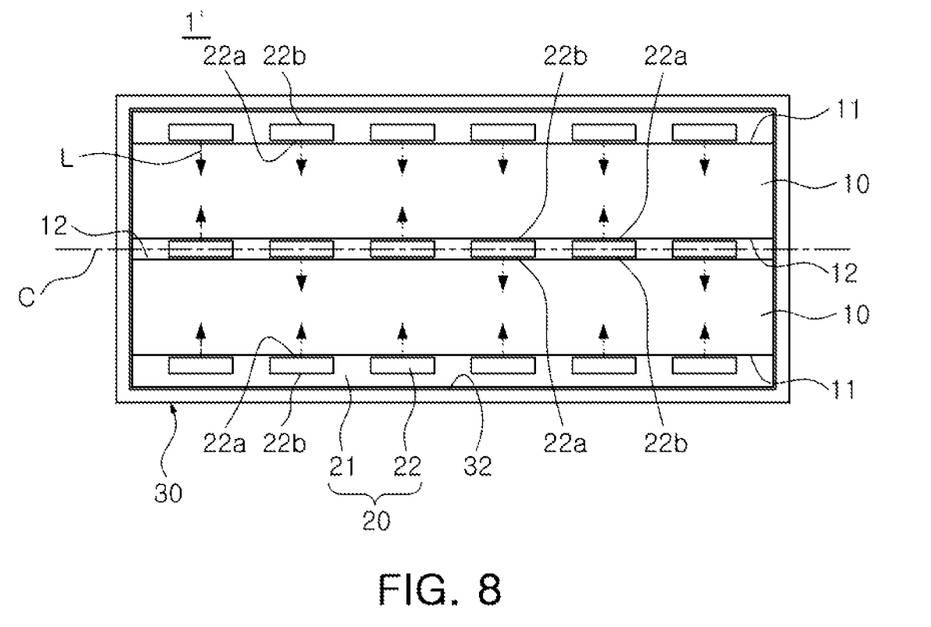
FIG. 8 is a plan view showing the backlight unit shown in FIG. 7.
Figure 9:
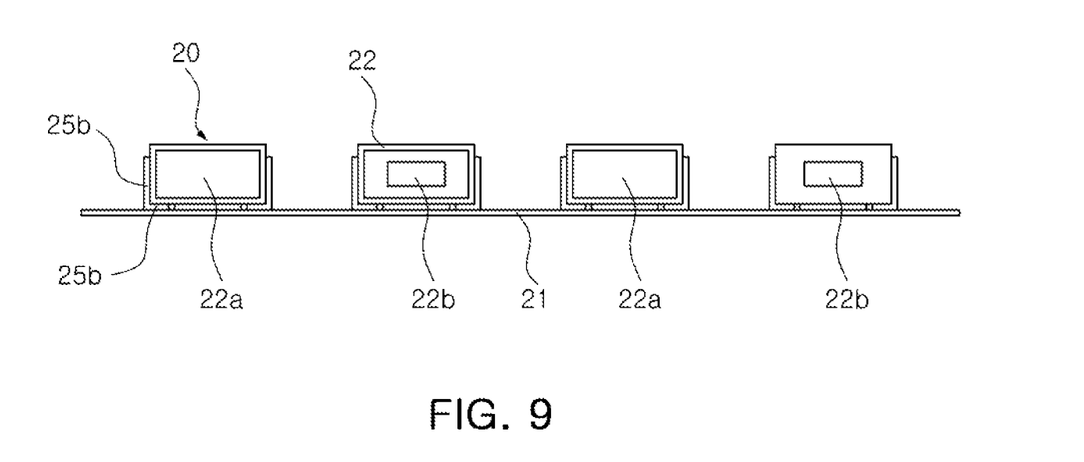
FIG. 9 is a front view showing a light source having a structure where the LED packages shown in FIG. 3 are alternately arranged having different light emitting directions.
Figure 10:
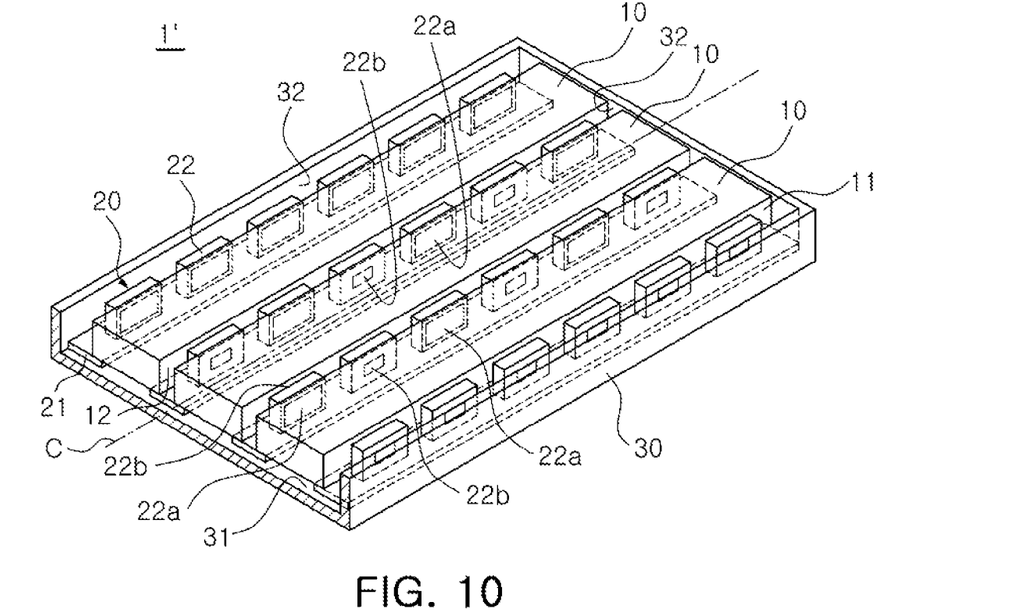
FIG. 10 is a perspective view showing a modification of the backlight unit shown in FIG. 7.
Figure 11:
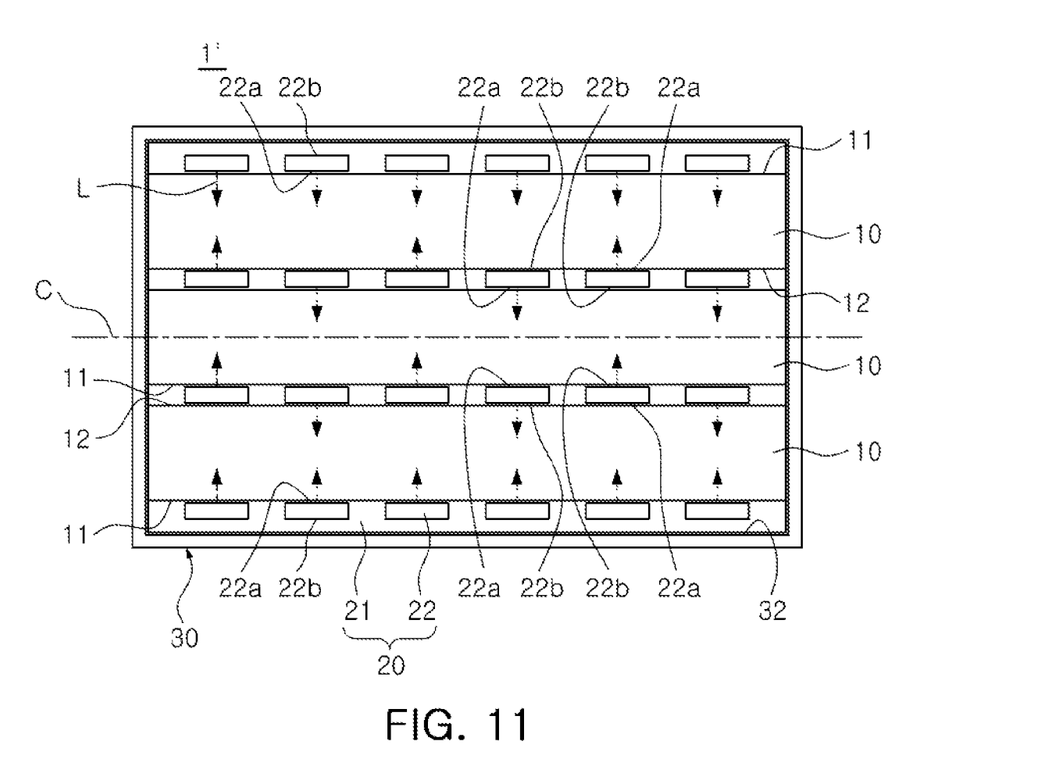
FIG. 11 is a plan view showing the backlight unit shown in FIG. 10.

FIG. 7 is a perspective view showing a backlight unit according to another exemplary embodiment of the present invention, FIG. 8 is a plan view showing the backlight unit shown in FIG. 7, and FIG. 9 is a front view showing a light source having a structure where the LED packages shown in FIG. 3 are alternately arranged having different light emitting directions. FIG. 10 is a perspective view showing a modification of the backlight unit shown in FIG. 7, and FIG. 11 is a plan view showing the backlight unit shown in FIG. 10.

The constitution of the backlight unit 1' shown in FIGS. 7 through 11 is substantially the same as that shown in the embodiment of FIGS. 1 though 6. That is, a plurality of light guide plates are disposed to be spaced apart from each other, being symmetrical to each other in order to face the central region of the chassis.

The present embodiment is distinguished in that the light sources of the plurality of light sources disposed, respectively, between one light guide plate and another light guide plate, emit light to the light guide plates on both sides adjacent to each other so that the light therefrom is mixed. Therefore, a description of substantially the same constitution between FIGS. 1 though 6 and FIGS. 7 through 11 will be omitted and the present invention will be described centering on the constitution distinguished in the embodiment of FIGS. 7 through 11, that is, the light source.

As shown in FIGS. 7 and 8, when the pair of light guide plates 10 are disposed to be opposed to each other and be symmetrical to each other based on the central region of the chassis 30, the light sources 20 may be disposed between the side cross-sections 12 opposed to each other along the cut line C of the central region in order to face the side cross-section 12 opposed to the light receiving surface 11 of the respective light guide plates 10.

At this time, the light sources 20 disposed on the central region have a structure in which they are alternately arranged by changing the direction of the front surface 22a, the light-emitting surface of the LED package 22, in order to emit light L to both directions symmetrical to each other.

More specifically, as shown in FIG. 9, the plurality of LED packages 22 may be alternately arranged on the bar-shaped substrate 21 so that the direction in which the LED chip 24 faces and the direction that another LED chip 24 adjacent thereto faces are alternated by 180°.

Apart from the light sources 20 according to the embodiment of FIGS. 1 through 6 in which light is emitted in only one direction, these light sources emit the light L in both directions, thereby making it possible to emit light in both directions.

Therefore, the light is incident and mixed on the light receiving surface and the side cross-section of the light guide plate, such that brightness becomes uniform throughout the light guide plates. As a result, the disadvantage that brightness uniformity is lowered due to the difference between brightness around the light receiving surface 11 of the light guide plate 10 on which the light sources 20 are disposed and brightness around the side cross-section 12 opposed to the light receiving surface 11 can be effectively solved.

Also, clearer image quality can be obtained throughout the liquid crystal display.

In particular, when the light guide plate 10 is divided into a plurality of block regions and local dimming is performed for each block in a large-screen liquid crystal display, the generation of dark lines on the boundary region is blocked, such that clearer image quality can be implemented.

Meanwhile, as shown in FIGS. 10 and 11, when a single light guide plate 10 is disposed on the central region of the chassis 30 so that the cut line C is positioned in the center of the light guide plate 10, the light sources 20 that each is provided on both side surfaces of the light guide plate 10 may have a structure to emit the light L to both directions, as shown in FIG. 7.

In particular, the light sources 20 having a structure where the plurality of LED packages 22 are alternately arranged having different light emitting directions are disposed on the boundary region between the light guide plates 10 adjacent to each other, such that the light sources 20 emit the light to the light receiving surface and the side cross-section of both light guide plates 10.

Further, the light sources 20 disposed along the side wall 32 of the chassis 30 need to emit light only to the light receiving surface 11 of the light guide plates 10 adjacent to each other, such that the light source having a structure where the respective LED packages are arranged in order to face in the same direction as shown in FIG. 1 can be used.

As set forth above, according to exemplary embodiments of the present invention, the brightness gradient can be set to be more uniform so that the brightness and brightness uniformity can be improved, even in a large-screen liquid crystal display where the plurality of light guide plates are spaced apart from each other and arranged, thereby making it possible to improve clarity and implement the clear image quality.

Further, the structure of the light guide plate is simplified, thereby making it possible to facilitate the manufacturing thereof and reduce the processing time thereof.

While the present invention has been shown and described in connection with the exemplary embodiments, it will be apparent to those skilled in the art that modifications and variations can be made without departing from the spirit and scope of the invention as defined by the appended claims.

What is claimed is:

1. A backlight unit, comprising:
a plurality of light sources;
a plurality of light guide plates being arranged alternately with the light sources so that light emitted from the light sources is incident thereupon; and
a chassis receiving the light sources and the light guide plates,
wherein the plurality of light guide plates are disposed to be spaced apart from each other, being symmetrical to each other in order to face the central region of the chassis, a pair of light guide plates opposed to each other on the central region being connected to each other so that the light therefrom is mixed.

2. The backlight unit of claim 1, wherein the light guide plate arranged on the central region includes a light receiving surface on which light is incident on one side surface thereof and another light receiving surface opposed to the light receiving surface on the other side surface thereof so that a pair of light receiving surfaces are symmetrical to each other, having the central region of the light guide plate therebetween.

3. The backlight unit of claim 1, wherein the plurality of light sources emit the light to the central region direction of the chassis, respectively.

4. The backlight unit of claim 1, wherein the light source includes
    a substrate disposed horizontally on a bottom surface of the chassis and having circuit wiring; and
    a plurality of LED packages vertically mounted on the substrate so that a LED chip faces the light receiving surface of the light guide plate.

5. The backlight unit of claim 4, wherein the LED package includes a lead terminal electrically connected to the circuit wiring along a side surface of a main body and is mounted on the substrate through the side surface.

6. The backlight unit of claim 5, wherein the lead terminal includes first leads each projected horizontally from the side surface of the main body in a minor axis direction to a rear surface of the main body, and a second lead bent vertically from one end of the first lead to be extended to a front surface of the main body and having one end bent vertically to the side surface of the main body in a major axis direction.

7. The backlight unit of claim 6, wherein the second lead is formed to be parallel to the side surface of the main body in the minor axis direction and the side surface thereof in the major axis direction to have an entirely 'L' shaped structure.

8. The backlight unit of claim 4, wherein in the light source, the plurality of LED packages are arranged on the substrate so that the respective LED chips provided on the plurality of LED packages face in the same direction.

9. The backlight unit of claim 1, wherein the light guide plate further includes a reflecting layer on a side cross-section opposed to the light receiving surface.

10. The backlight unit of claim 1, further comprising an optical sheet disposed on the upper portion of the light guide plate and receiving light.

11. A backlight unit, comprising:
    a plurality of light sources;
    a plurality of light guide plates being arranged alternately with the light sources so that light emitted from the light sources is incident thereupon; and
    a chassis receiving the light sources and the light guide plates,
    wherein the plurality of light guide plates are disposed to be spaced apart from each other, being symmetrical to each other in order to face the central region of the chassis, the light sources of the plurality of light sources disposed, respectively, between the light guide plate and another light guide plate to emit light to the light guide plates on both sides adjacent to each other so that the light therefrom is mixed.

12. The backlight unit of claim 11, wherein the plurality of light sources emit light between the light receiving surface of the light guide plate adjacent to each light source and the side cross-section of another light guide plate to both directions of the light receiving surface and the side cross-section.

13. The backlight unit of claim 11, wherein the light source includes
    a substrate disposed horizontally on a bottom surface of the chassis and having circuit wiring; and
    a plurality of LED packages vertically mounted on the substrate so that a LED chip faces the light receiving surface of the light guide plate.

14. The backlight unit of claim 13, wherein the LED package includes a lead terminal electrically connected to the circuit wiring along a side surface of a main body and is mounted on the substrate through the side surface.

15. The backlight unit of claim 14, wherein the lead terminal includes first leads each projected horizontally from the side surface of the main body in a minor axis direction to a rear surface of the main body, and a second lead bent vertically from one end of the first lead to be extended to a front surface of the main body and having one end bent vertically to the side surface of the main body in a major axis direction.

16. The backlight unit of claim 15, wherein the second lead is formed to be parallel to the side surface of the main body in the minor axis direction and the side surface thereof in the major axis direction to have an entirely 'L' shaped structure.

17. The backlight unit of claim 13, wherein in the light source, the plurality of LED packages are alternately arranged on the substrate so that the direction in which the respective LED chips provided on the plurality of LED packages face and the direction in which another LED chips each adjacent thereto face are changed by 180°.

18. The backlight unit of claim 17, wherein the light source where the plurality of LED packages are alternately arranged is disposed on the boundary region between the light guide plates adjacent to each other.

19. The backlight unit of claim 11, further comprising an optical sheet disposed on the upper portion of the light guide plate and receiving light.

* * * * *